(12) United States Patent
Kato et al.

(10) Patent No.: US 6,714,738 B2
(45) Date of Patent: Mar. 30, 2004

(54) MOTOR MOUNTING STRUCTURE FOR CAMERAS

(75) Inventors: Koichi Kato, Saitama-ken (JP); Kenji Yamane, Saitama-ken (JP)

(73) Assignee: Fuji Photo Optical Co., Ltd., Saitama-Ken (JP)

(*) Notice: Subject to any disclaimer, the term of this patent is extended or adjusted under 35 U.S.C. 154(b) by 55 days.

(21) Appl. No.: 10/108,838

(22) Filed: Mar. 27, 2002

(65) Prior Publication Data

US 2002/0141753 A1 Oct. 3, 2002

(30) Foreign Application Priority Data

Mar. 28, 2001 (JP) .......................................... 2001-091611

(51) Int. Cl.$^7$ ................................................ G03B 17/02
(52) U.S. Cl. ........................ 396/535; 396/541; 348/374
(58) Field of Search ................................. 396/535, 538, 396/541; 348/374

(56) References Cited

U.S. PATENT DOCUMENTS

| | | | | |
|---|---|---|---|---|
| 4,865,432 A | * | 9/1989 | Aoyagi et al. | 359/696 |
| 4,952,955 A | * | 8/1990 | Iwata et al. | 396/75 |
| 5,787,318 A | * | 7/1998 | Katoh et al. | 396/442 |

* cited by examiner

*Primary Examiner*—Russell Adams
*Assistant Examiner*—Michael Dalakis
(74) *Attorney, Agent, or Firm*—Joseph Levi; Clifford Chance US LLP

(57) ABSTRACT

A lens barrel is associated with a frame body of a camera for advancing and retracting movements along an optical axis direction. A film accommodating chamber is located on the side outward from the lens barrel with respect to a direction normal to the optical axis direction. A motor is secured to the frame body, mechanical power of the motor being transmitted to the lens barrel via a gear train to move the lens barrel along the optical axis direction. The motor is located within a space defined by the lens barrel and the film accommodating chamber, such that an output shaft extends in a plane normal to the optical axis. The frame body has a path for insertion of a motor securing tool.

3 Claims, 4 Drawing Sheets

MOTOR MOUNTING STRUCTURE FOR CAMERAS

CROSS-REFERENCE TO RELATED APPLICATION

This application claims priority to Japanese patent application number 2001-091611 filed Mar. 28, 2001.

BACKGROUND OF THE INVENTION

1. Field of the Invention

This invention relates to a structure for mounting a motor for moving a lens barrel of a camera along a direction of an optical axis of a lens in accordance with a variable power operation.

2. Description of the Related Art

In cases where photographing operations with cameras are performed, variable power operations (zooming operations) are often performed for altering a focal length of a taking lens between a wide angle photographing side and a telescopic photographing side. For the variable power operations, a lens barrel of the camera is moved along the direction of the optical axis of the lens. At this time, ordinarily, the lens barrel is driven by a motor via a gear train comprising a plurality of spur gears. The motor has an output shaft, to which a spur gear has been secured, and the gear train comprising the spur gears is utilized. Therefore, the motor is located inevitably such that the output shaft is parallel with the optical axis direction. The motor is secured by mounting screws, and the like, to a motor securing member and is thereby secured to a frame body of the camera.

In cases where the output shaft of the motor is to be located in parallel with the optical axis direction, if the motor is an ordinary motor having an approximately circular cylinder-like shape, a comparatively large space for accommodating the entire length of the motor within a frame body of the camera will be required of the camera along the length direction of the motor, i.e. along the optical axis direction. Therefore, in such cases, the problems occur in that the camera cannot be rendered thin.

In order for the problems described above to be solved, it may be considered to employ a technique, wherein the output shaft of the motor is located in a plane normal to the optical axis (i.e., at a right angle with respect to the thickness direction of the camera). However, with the technique described above, in cases where the motor is secured by screws to the frame body, threaded holes for engaging with the screws also extend in the direction normal to shafts (i.e., rotation shafts) of the spur gears of the gear train, which shafts are secured to the frame body and are parallel with the optical axis. Therefore, due to the locations of the shafts of the spur gears of the gear train, the problems occur in that the shafts of the spur gears of the gear train obstruct the motor securing work, and the motor cannot be secured easily to the frame body. Also, when a tool for screwing is inserted toward a motor securing section, the problems occur in that the frame body is apt to obstruct the tool insertion path. Further, instead of the motor being mounted with the screwing process, it may be considered to mount the motor with a process for fitting the motor into the frame body. However, in cases where the motor is mounted with a process for fitting the motor into the frame body, the problems occur in that the motor cannot be mounted tightly, and looseness of the motor mounting is apt to occur with the passage of time.

SUMMARY OF THE INVENTION

The primary object of the present invention is to provide a motor mounting structure for a camera, which enables a camera to be rendered thin.

The present invention provides a motor mounting structure for a camera, the camera comprising:
i) a lens barrel associated with a frame body of the camera such that the lens barrel is capable of advancing and retracting along an optical axis direction,
ii) a film accommodating chamber, which is located on the side outward from the lens barrel with respect to a direction normal to the optical axis direction, and
iii) a motor, which is secured to the frame body, mechanical power of the motor being transmitted to the lens barrel via a gear train comprising a plurality of gears in order to move the lens barrel along the optical axis direction, wherein the motor is located within a space, which is defined by the lens barrel and the film accommodating chamber, such that an output shaft of the motor extends in a plane normal to the optical axis direction, and the frame body has a path, through which a tool for securing the motor to the frame body by screwing is to be inserted.

The term "film accommodating chamber" as used herein means the space for accommodating a film cartridge or the space for winding up and accommodating the film having been drawn out of the film cartridge.

In the motor mounting structure for a camera in accordance with the present invention, the output shaft of the motor extends in the plane normal to the optical axis direction. Specifically, the output shaft of the motor may extend in the plane intersecting exactly at an angle of 90° with the optical axis direction. Alternatively, the output shaft of the motor may be inclined slightly with respect to the plane intersecting exactly at an angle of 90° with the optical axis direction.

Also, in the motor mounting structure for a camera in accordance with the present invention, the path may be formed such that the tool inserted through the path does not interfere with rotation shafts of the gears constituting the gear train. The path may be formed by forming a cut-away area at a portion of the frame body.

The formation of the cut-away area includes the cases wherein the cut-away area is formed inwardly from an edge of the frame body, and the cases wherein a hole (an opening), which does not open to the edge, is formed in the frame body.

With the motor mounting structure for a camera in accordance with the present invention, the motor for moving the lens barrel via the gear train along the optical axis direction is located within the space, which is defined by the lens barrel and the film accommodating chamber, such that the output shaft of the motor extends in the plane normal to the optical axis direction. Also, the frame body has the path, through which the tool for securing the motor to the frame body by screwing is to be inserted. Therefore, the thickness of the camera need not be set to be large in the optical axis direction in order for the motor to be accommodated. Accordingly, the camera is capable of being rendered thin. The motor mounting structure for a camera in accordance with the present invention is particularly efficient for a small camera utilizing small film, such as an APS cartridge.

With the motor mounting structure for a camera in accordance with the present invention, the path may be formed such that the tool inserted through the path does not interfere with the rotation shafts of the gears constituting the gear train. In such cases, the path is capable of being formed reliably. In cases where the path is formed by forming the cut-away area at a portion of the frame body, the path is capable of being formed easily.

DESCRIPTION OF THE PREFERRED EMBODIMENTS

The present invention will hereinbelow be described in further detail with reference to the accompanying drawings.

Figure 1:
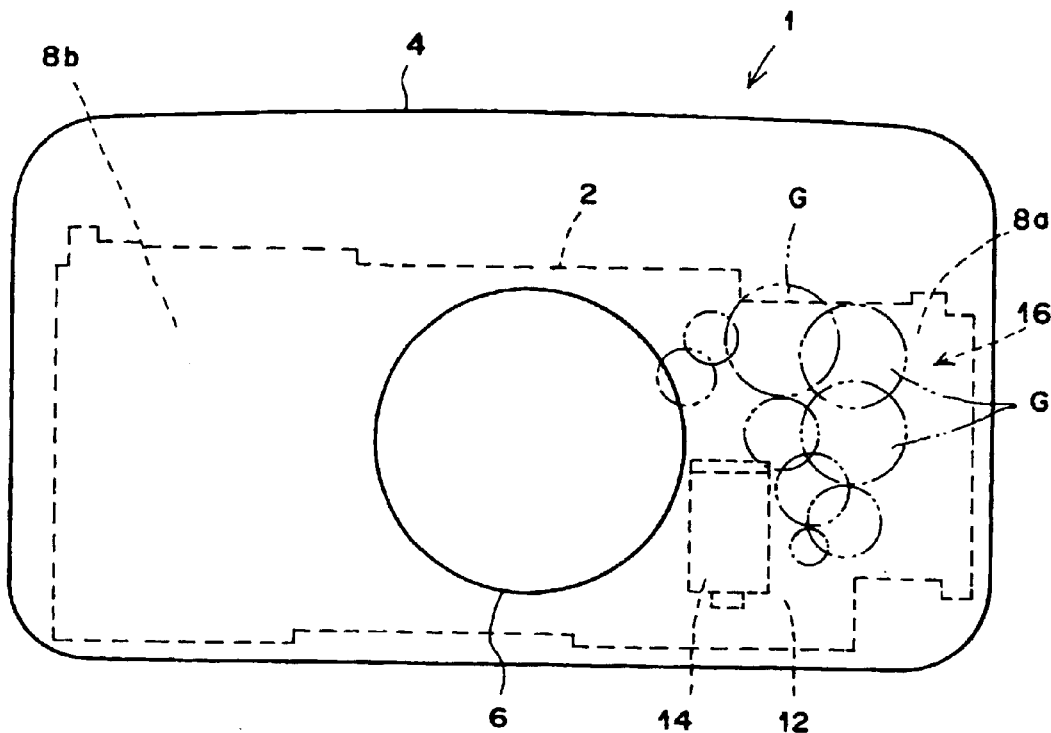
FIG. 1 is a schematic front view showing an internal structure of a camera, in which an embodiment of the motor mounting structure for a camera in accordance with the present invention is employed.
Figure 2:
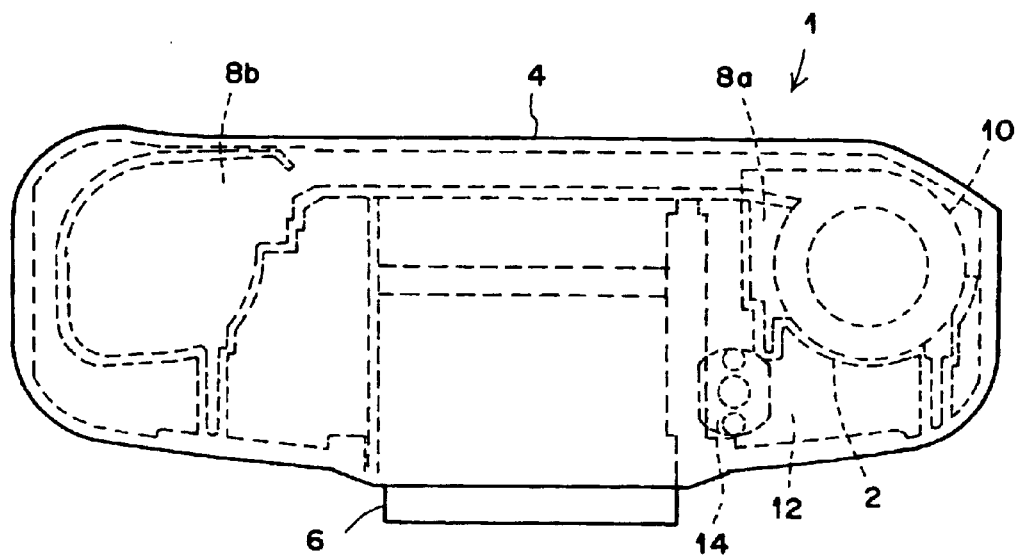
FIG. 2 is a schematic plan view showing the camera of FIG. 1.

FIG. 1 is a schematic front view showing an internal structure of a camera, in which an embodiment of the motor mounting structure for a camera (hereinbelow referred to simply as the mounting structure) in accordance with the present invention is employed. FIG. 2 is a schematic plan view showing the camera of FIG. 1.

As illustrated in FIG. 1 and FIG. 2, a camera 1 comprises a lens barrel 6, which is located approximately at the center region on the front side of a camera body 4. A frame body 2 made from a synthetic resin is located within the camera body 4. As illustrated most clearly in FIG. 1, film accommodating chambers 8 (8a, 8b) are formed on the two sides of the frame body 2. In this embodiment, as illustrated in FIG. 2, an APS cartridge (hereinbelow referred to simply as the cartridge) 10 is accommodated in the film accommodating chamber 8a. In the other film accommodating chamber 8b, the film (not shown) having been drawn out of the cartridge 10 is wound up and accommodated.

As illustrated most clearly in FIG. 2, a space (dead space) 12 having an approximately triangular plan shape is formed between the lens barrel 6 and the film accommodating chamber 8a. A motor 14 for performing a variable power operation of the lens barrel 6 is located within the space 12 and in an orientation such that a rotation shaft (i.e., an output shaft) of the motor 14 extends in a plane, which is approximately normal to the optical axis direction of the lens of the lens barrel 6. The orientation of the motor 14 is one of important features of the present invention. As illustrated in FIG. 1, the rotation of the motor 14 is transmitted to the lens barrel 6 by a gear train 16, which comprises a plurality of gears (spur gears) G, G, . . . , and the lens barrel 6 is thereby moved along the optical axis direction via a movement mechanism (not shown).

Figure 3:
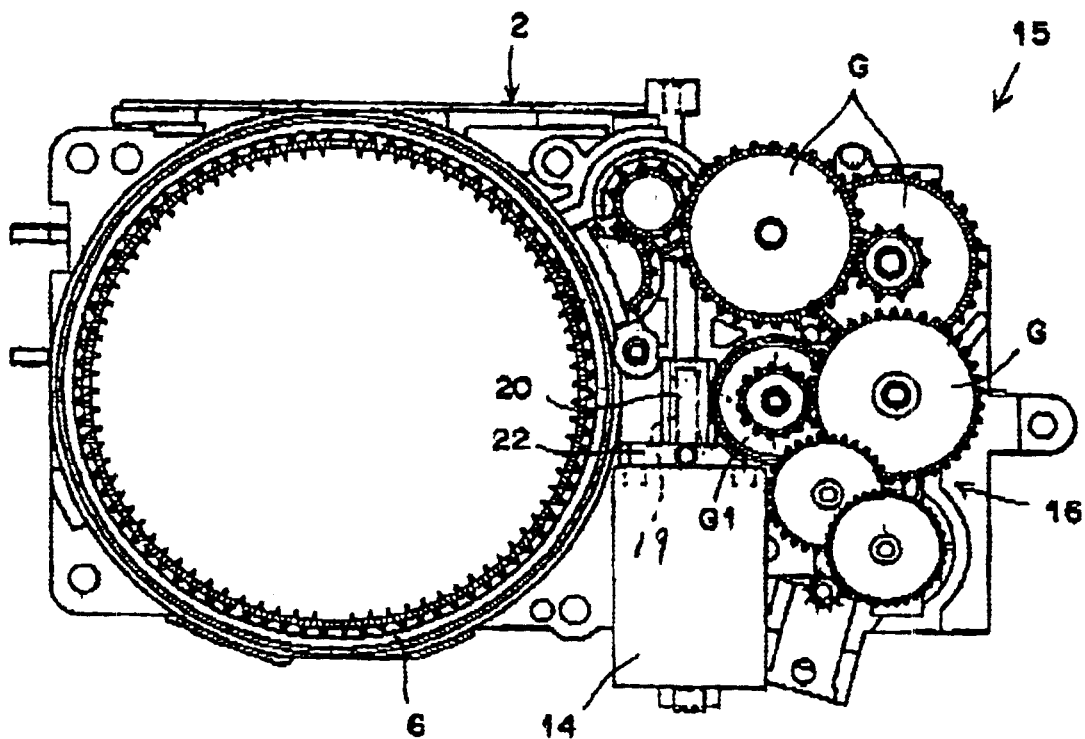
FIG. 3 is a fragmentary enlarged front view showing relationship among positions of a motor, a gear train, and a lens barrel.

FIG. 3 is a fragmentary enlarged front view showing relationship among positions of the motor 14, the gear train 16, and the lens barrel 6. With reference to FIG. 3, in a driving mechanism 15, a worm gear 20 secured to an output shaft 19 of the motor 14 firstly engages with a gear G1. The rotation of the motor 14 is transmitted through speed reduction by the plurality of the gears G, G, . . . to the lens barrel 6. The rotations of the gears G, G, . . . are ultimately transmitted to an advancing and retracting mechanism (not shown) for the lens barrel 6.

Figure 4:
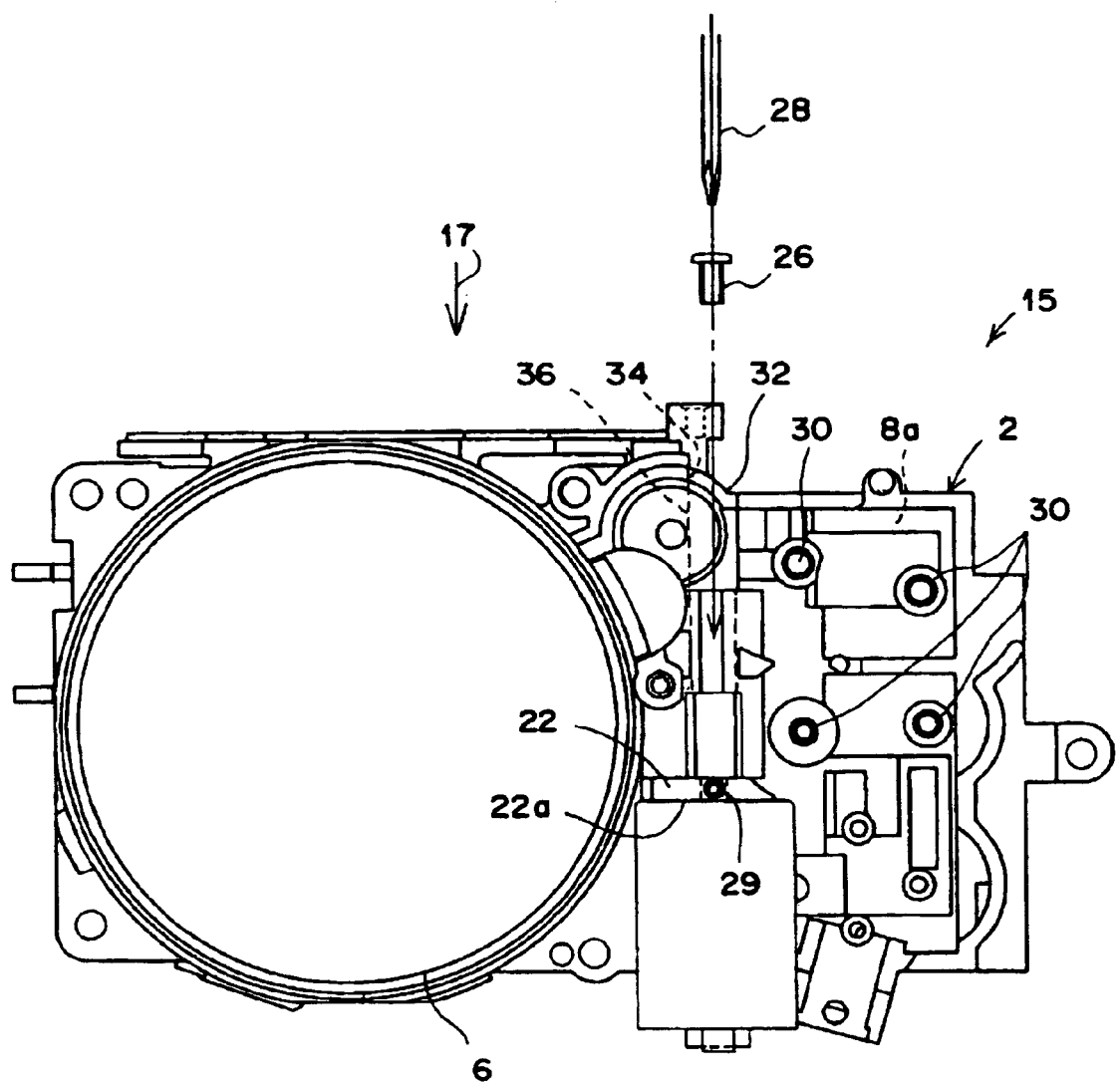
FIG. 4 is a fragmentary enlarged front view, similar to FIG. 3, showing the embodiment of the motor mounting structure for a camera in accordance with the present invention, the gear train being omitted for clearness.
Figure 5:
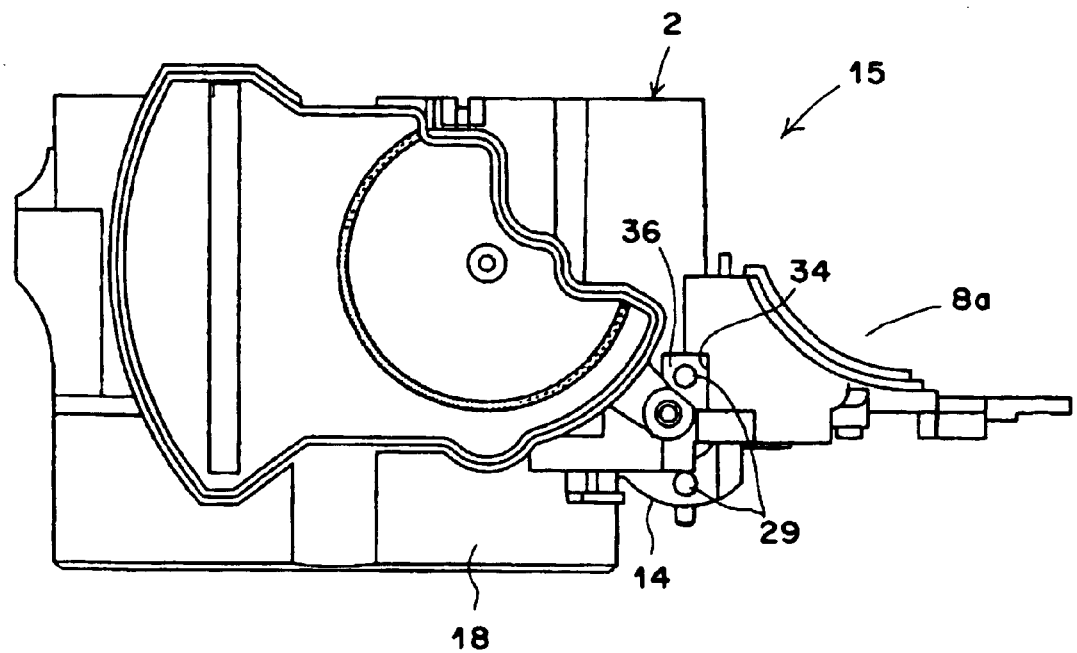
FIG. 5 is a fragmentary enlarged front view taken from the direction indicated by the arrow 17 in FIG. 4, the view showing the embodiment of the motor mounting structure for a camera in accordance with the present invention, the gear train being omitted for clearness.

How the motor 14 is mounted will be described hereinbelow with reference to FIG. 4 and FIG. 5. FIG. 4 is a fragmentary enlarged front view, similar to FIG. 3, showing a structure for mounting the motor 14, the gears G, G, . . . of the gear train 16 being omitted for clearness. FIG. 5 is a fragmentary enlarged front view taken from the direction indicated by the arrow 17 in FIG. 4, the view showing the structure for mounting the motor 14, the gear train 16 being omitted for clearness. As illustrated in FIG. 4, a motor mounting section 22 is formed as a body integral with the frame body 2 of the camera 1. The motor mounting section 22 is projected from the frame body 2 in the direction heading toward the foreground side of the plane of the sheet of FIG. 4. The bottom surface of the motor mounting section 22 acts as a mounting surface 22a. As illustrated in FIG. 5, the motor mounting section 22 has two threaded holes 29, 29, which extend through the motor mounting section 22 from the top surface of the motor mounting section 22 to the bottom surface of the motor mounting section 22.

When the motor 14 is to be mounted, the motor 14 is inserted into the camera 1 from below the mounting surface 22a with output shaft 19 of the motor 14 facing up and is brought into abutment with the mounting surface 22a. Thereafter, by use of a tool 28 from above the camera 1, each of screws 26, 26 is screwed into one of the threaded holes 29, 29. The motor 14 is secured to the motor mounting section 22. A plurality of shafts (i.e., rotation shafts) 30, 30, . . . for supporting the gears G, G, . . . of the gear train 16, such that the gears G, G, . . . are capable of rotating, are projected from the frame body 2. Also, the frame body 2 has parts for supporting the shafts 30, 30, . . . or forming the shafts 30, 30, . . . . The shafts 30, 30, . . . are formed so as not to interfere with a path 36, through which the tool 28 for mounting the motor 14 is to be inserted. Also, as illustrated in FIG. 5, a cut-away area 34 is formed at a section of the frame body 2, i.e. an interfering section 32, which will interfere with the path 36 if the cut-away area 34 is not formed. The threaded hole 29, which is located on the lower side in FIG. 5, is located at the position that does not interfere with the frame body 2. Therefore, when the screw 26 is to be screwed into the threaded hole 29, which is located on the lower side in FIG. 5, the tool 28 is capable of being inserted from above without being obstructed by the frame body 2. However, the threaded hole 29, which is located on the upper side in FIG. 5, is located at the position that interferes with the frame body 2. Therefore, the cut-away area 34 is formed, and the path 36, through which the tool 28 is to be inserted for screwing the screw 26 into the threaded hole 29, which is located on the upper side in FIG. 5, is thereby formed. In lieu of the cut-away area 34, an opening maybe formed in the frame body 2.

In the embodiment described above, the APS cartridge is utilized as the film. Alternatively, one of various other kinds of film, such as ordinary 35 mm film, may be utilized.

Also, in the embodiment described above, the shaft of the motor 14 extends vertically in FIG. 1, i.e. in the direction normal to the plane of the sheet of FIG. 2. Alternatively, for example, the shaft of the motor 14 may extend horizontally in FIG. 1, i.e. in the direction along the plane of the sheet of FIG. 2.

What is claimed is:

1. A motor mounting structure for a camera, the camera comprising:

i) a lens barrel associated with a frame body of the camera such that the lens barrel is capable of advancing and retracting along an optical axis direction, ii) a film accommodating chamber, which is located on the side outward from the lens barrel with respect to a direction normal to the optical axis direction, and iii) a motor, which is secured to the frame body, mechanical power of the motor being transmitted to the lens barrel via a gear train comprising a plurality of gears in order to move the lens barrel along the optical axis direction, wherein the motor is located within a space, which is defined between an outer surface of the lens barrel and an outer surface of the film accommodating chamber, such that an output shaft of the motor extends in a plane normal to the optical axis direction, and the frame body has a path extending perpendicular to the optical axis, through which a tool for securing the motor to the frame body by screwing is to be inserted.

2. A motor mounting structure for a camera as defined in claim 1 wherein the path is formed such that the tool inserted through the path does not interfere with rotation shafts of the gears constituting the gear train.

3. A motor mounting structure for a camera as defined in claim 1 wherein the path is formed by forming a cut-away area at a portion of the frame body.

* * * * *